US012085732B1

(12) United States Patent
Brickner et al.

(10) Patent No.: US 12,085,732 B1
(45) Date of Patent: Sep. 10, 2024

(54) COMBINED COLLIMATION AND DIFFUSER LENS FOR FLOOD ILLUMINATOR

(71) Applicants: Waymo LLC, Mountain View, CA (US); Nissei Technology Corporation, Hyogo (JP)

(72) Inventors: Michael Brickner, Mountain View, CA (US); Hui Son, Hayward, CA (US); Chandra Kakani, Fremont, CA (US); Erin Eppard, Sunnyvale, CA (US); Akio Yamakawa, Hyogo (JP)

(73) Assignees: Waymo LLC, Mountain View, CA (US); Nissei Technology Corporation, Hyogo (JP)

( * ) Notice: Subject to any disclaimer, the term of this patent is extended or adjusted under 35 U.S.C. 154(b) by 916 days.

(21) Appl. No.: 17/125,223

(22) Filed: Dec. 17, 2020

(51) Int. Cl.
| | |
|---|---|
| *G01S 17/10* | (2020.01) |
| *B60Q 1/00* | (2006.01) |
| *G01S 7/481* | (2006.01) |
| *G01S 17/89* | (2020.01) |
| *G01S 17/931* | (2020.01) |
| *G02B 1/04* | (2006.01) |
| *G02B 1/11* | (2015.01) |

(Continued)

(52) U.S. Cl.
CPC ......... *G02B 3/0068* (2013.01); *B60Q 1/0023* (2013.01); *G01S 7/4814* (2013.01); *G01S 7/4817* (2013.01); *G01S 17/10* (2013.01); *G01S 17/89* (2013.01); *G01S 17/931* (2020.01); *G02B 1/041* (2013.01); *G02B 1/11* (2013.01); *G02B 3/08* (2013.01); *G02B 2003/0093* (2013.01)

(58) Field of Classification Search
None
See application file for complete search history.

(56) References Cited

U.S. PATENT DOCUMENTS

| 3,670,260 A | 6/1972 | Koester et al. |
| 4,813,762 A | 3/1989 | Leger et al. |

(Continued)

FOREIGN PATENT DOCUMENTS

| CN | 206861305 U | 1/2018 |
| JP | 2000321675 | 11/2000 |

(Continued)

OTHER PUBLICATIONS

Cirino et al., "Low-cost Fresnel microlens array fabricated by a home-built maskless lithography system," Proceedings of SPIE—The International Society for Optical Engineering, Oct. 2012, 7 pages.

(Continued)

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to optical systems and vehicles, which may incorporate lidar sensors. An example optical system includes a light-emitter device configured to emit emission light. The optical system also includes an optical element including a first surface and an opposing second surface. The first surface includes a diffusing surface configured to diffuse the emission light to form diffused light. The second surface includes a focusing surface configured to focus the diffused light to provide an intensity profile of light emitted within a field of view of the optical system.

20 Claims, 15 Drawing Sheets

(51) Int. Cl.
 *G02B 3/00* (2006.01)
 *G02B 3/08* (2006.01)

(56) References Cited

U.S. PATENT DOCUMENTS

| | | | |
|---|---|---|---|
| 5,150,966 A | 9/1992 | Nelson | |
| 5,315,427 A | 5/1994 | Rauch et al. | |
| 6,859,326 B2 | 2/2005 | Sales | |
| 7,652,752 B2 | 1/2010 | Fetzer et al. | |
| 7,706,073 B2 | 4/2010 | Munro | |
| 9,831,630 B2 | 11/2017 | Lipson | |
| 2002/0034710 A1* | 3/2002 | Morris | G02B 5/0221 430/945 |
| 2002/0159044 A1 | 10/2002 | Mei et al. | |
| 2009/0306892 A1* | 12/2009 | Malka | G02B 23/18 701/469 |
| 2010/0195202 A1* | 8/2010 | Masalkar | G03B 21/10 353/74 |
| 2015/0253469 A1* | 9/2015 | Le Gros | G02B 13/22 359/619 |
| 2016/0164261 A1 | 6/2016 | Warren | |
| 2016/0197452 A1 | 7/2016 | Mor | |
| 2018/0316160 A1 | 11/2018 | Raring et al. | |
| 2019/0179028 A1 | 6/2019 | Pacala et al. | |

FOREIGN PATENT DOCUMENTS

| | | |
|---|---|---|
| JP | 2008033097 | 2/2008 |
| WO | 2006/045545 | 5/2006 |

OTHER PUBLICATIONS

Wang et al., "Design of optical element combining Fresnel lens with microlens array for uniform light-emitting diode lighting," Journal of the Optical Society of America A, Aug. 16, 2012, vol. 29, No. 9.

* cited by examiner

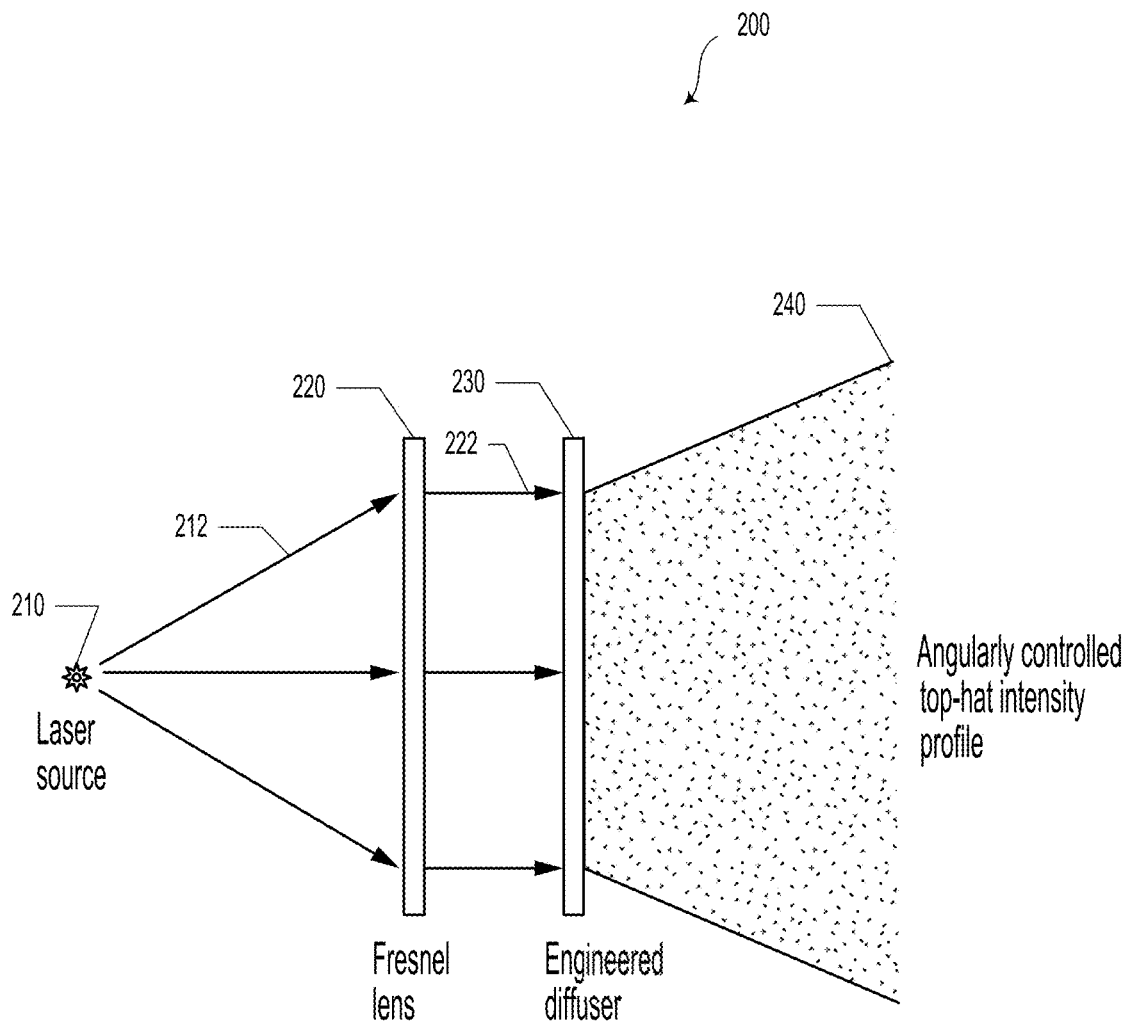
Figure 2 – Prior Art

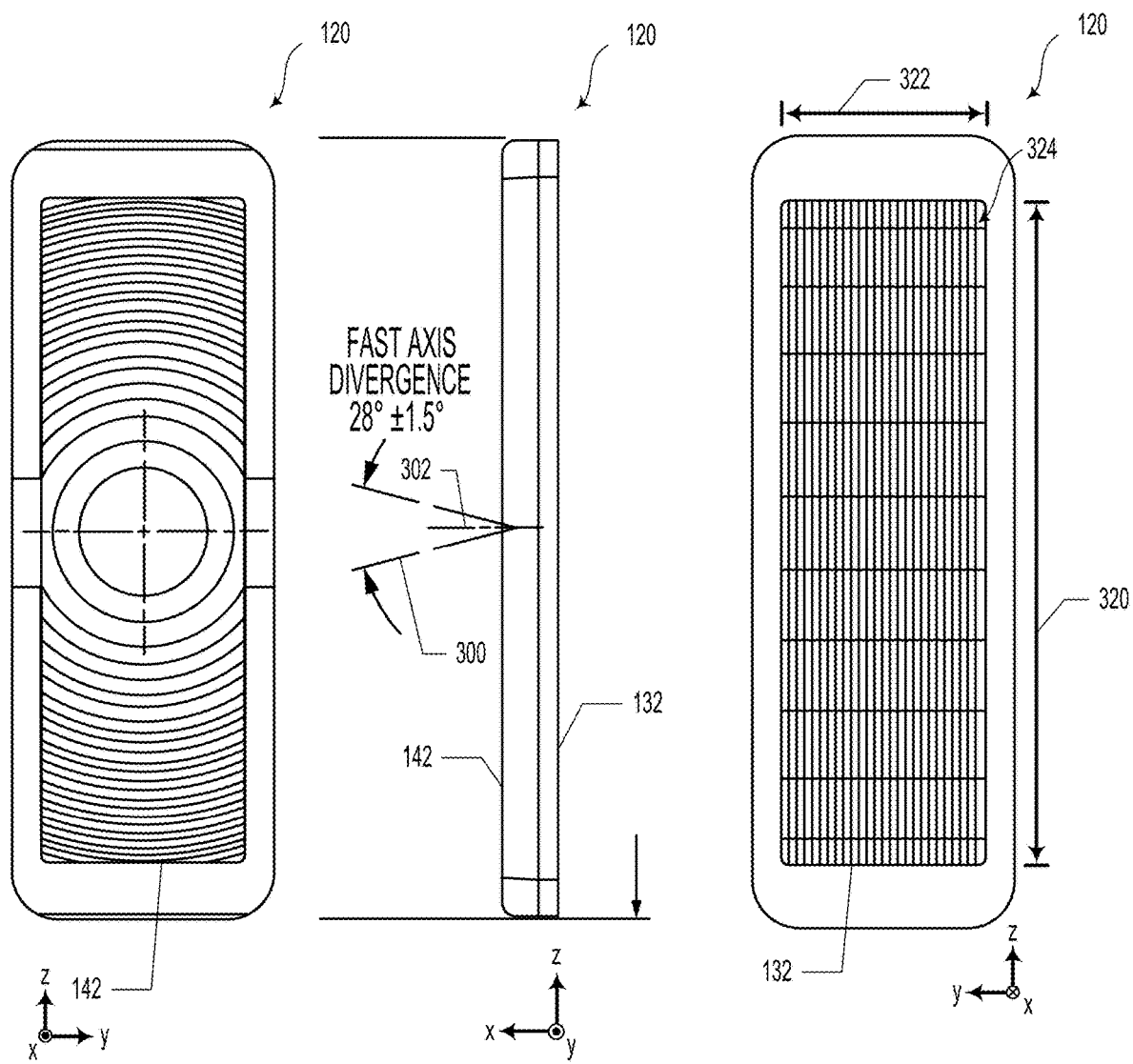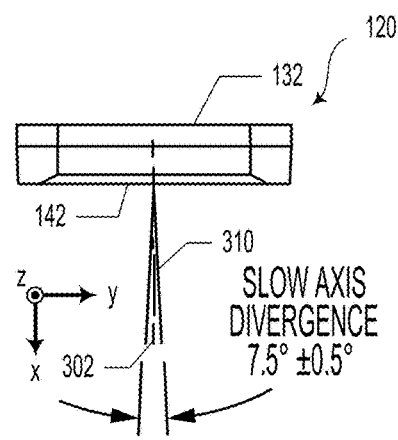
Figure 3A

COMBINED COLLIMATION AND DIFFUSER LENS FOR FLOOD ILLUMINATOR

BACKGROUND

Flood illuminator systems may be configured to emit light into a field of view such that the emitted light has an angularly-controlled top-hat intensity profile. Conventional illuminator systems may include a light source, a first optical element, and a second optical element.

In such scenarios, the light source could emit emission light that interacts with the first optical element so as to collimate the emission light, forming collimated light. The collimated light could subsequently interact with the second optical element so as to diffuse the collimated light, forming diffused light. In some conventional examples, the first optical element could include a flat (e.g., plano) surface and focusing surface (e.g., a Fresnel lens surface). The second optical element could include a flat (e.g., plano) surface and diffusing surface (e.g., a microlens array or another type of optical diffusing element). As an example, conventional systems utilized in retail display lighting involve separate optical elements for the lens and diffuser.

SUMMARY

In the present disclosure, optical systems and vehicles are described as including a single optical element that could include a diffusing surface (e.g., a microlens array) and a focusing surface (e.g., a Fresnel lens surface). Such embodiments could replace two individual lenses with a single combination lens element.

In a first aspect, an optical system is provided. The optical system includes a light-emitter device configured to emit emission light and an optical element. The optical element includes a first surface and an opposing second surface. The first surface includes a diffusing surface configured to diffuse the emission light to form diffused light. The second surface includes a focusing surface configured to focus the diffused light to provide an intensity profile of light emitted within a field of view of the optical system.

In a second aspect, a vehicle is provided. The vehicle includes an optical system. The optical system includes a lidar system configured to provide range data within a lidar field of view. The optical system also includes a light-emitter device configured to emit emission light. The optical system additionally includes an optical element having a first surface and an opposing second surface. The first surface includes a diffusing surface configured to diffuse the emission light to form diffused light. The second surface includes a focusing surface configured to focus the diffused light to provide an intensity profile of light emitted within a field of view of the optical system.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2 illustrates a prior art optical system.
FIG. 3A illustrates the optical element of the optical system of FIG. 1, according to an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In the present disclosure, example embodiments include a single optical element could include a diffusing surface (e.g., a microlens array) and a focusing surface (e.g., a Fresnel lens surface). Such embodiments could replace two individual lenses with a single combination lens element. In some examples, the single combination lens element could provide optical and alignment simplicity, reduced cost, and reduced mechanical part count. Furthermore, laser safety may also be improved by a single lens embodiment, which reduces the number of potential items that could fail.

In some embodiments, the combination lens element could be injection molded. For example, a two-sided injection mold could be utilized by a lens injection molding tool.

Combination lens elements could be utilized in imaging and non-imaging applications. In some embodiments, an illuminator system with a combination lens element could be utilized to provide a desired intensity profile in support of a camera system and/or a lidar system. The illuminator system could be utilized to provide a desired intensity profile of light in the infrared wavelengths or other optical wavelengths. Additionally or alternatively, the illuminator system could be attached to a vehicle, such as an autonomous or semi-autonomous vehicle.

II. Example Optical Systems

Figure 1:
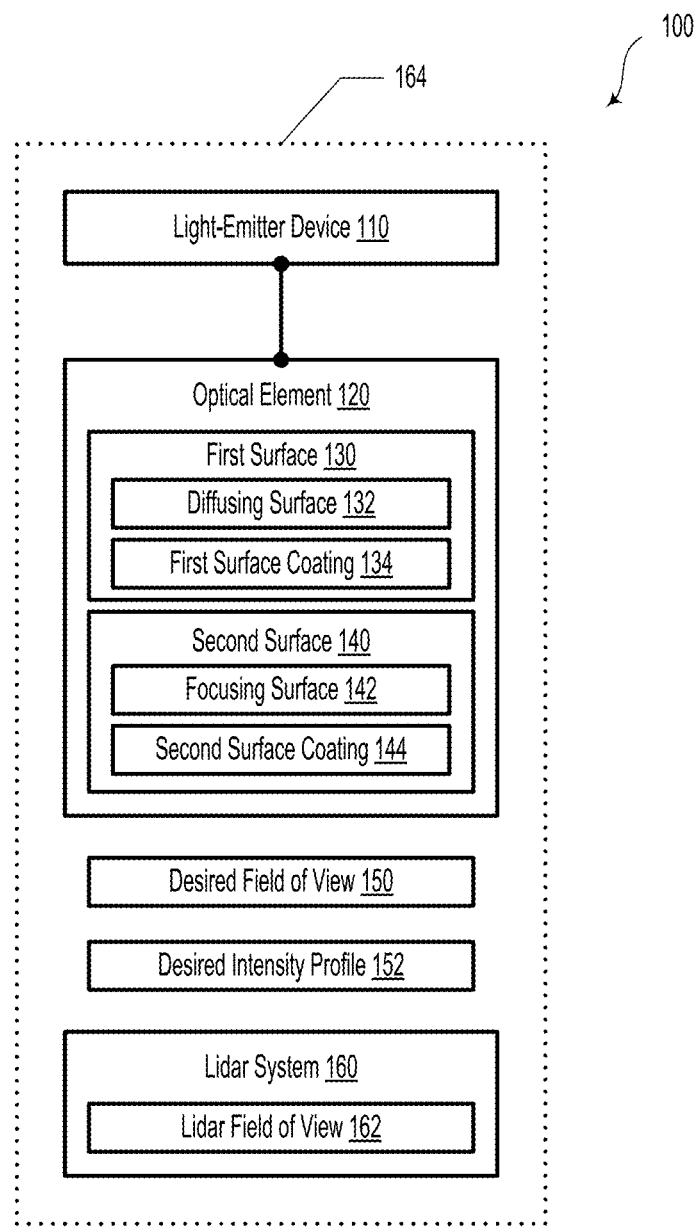
FIG. 1 illustrates an optical system, according to an example embodiment.

FIG. 1 illustrates an optical system 100, according to an example embodiment. In some embodiments, the optical system 100 could include a flood illuminator for a lidar system and/or a camera system. The optical system 100 includes a light-emitter device 110 configured to emit emission light. For example, light-emitter device 110 could include at least one laser diode device (e.g., between 4 and 10 high-power semiconductor lasers and/or light-emitting diodes).

In some examples, the light-emitter device 110 could include a multi-bar laser diode device. In such scenarios, the multi-bar laser diode device could include a plurality of semiconductor laser bars. For example, the multi-bar laser diode device could be configured to emit infrared light pulses. In such scenarios, the infrared light pulses could include light having a wavelength of about 905 nanometers (e.g., between 900 and 910 nanometers, between 895 and 915 nanometers, between 885 and 925 nanometers, etc.). It will be understood that light-emitter devices configured to emit light having other infrared wavelengths (e.g., 700 nanometers to 1 millimeter) are possible and contemplated.

Optical system 100 also includes an optical element 120. The optical element 120 includes a first surface 130 and an opposing second surface 140. The first surface 130 includes a diffusing surface 132 configured to diffuse the emission light to form diffused light. The second surface 140 comprises a focusing surface 142 configured to focus the diffused light to provide a desired intensity profile 152 of light emitted within a desired field of view 150 of the optical system 100. In such scenarios, the combination of the light-emitter device 110 and the optical element 120 could provide a flood illumination source for a lidar system or camera system.

In various embodiments, the optical element 120 could be formed from at least one of: compression molded glass, a cyclic olefin copolymer (COC or COP) material, polymethylmethacrylate (PMMA), polycarbonate (PC), polypropylene (PP), or polyethylene (PE). In such scenarios, optical element 120 could be formed from a moldable optical material. In other examples, the optical element 120 could be formed with a cureable adhesive material (e.g., a thermoset epoxy). Yet further, the optical element 120 could be fabricated using semiconductor manufacturing techniques, such as by patterning an optical material using photolithography and etching techniques. It will be understood that other materials and manufacturing techniques are contemplated and possible in forming the optical element 120.

In some embodiments, the diffusing surface 132 could include a microlens array. Additionally or alternatively, the focusing surface 142 could include a Fresnel lens surface. It will be understood that other types of optical elements could be utilized so as to diffuse and/or focus light within the scope of the present disclosure. Other examples of focusing surface 142 could include diffractive optical elements and/or holographic elements.

In some embodiments, the first surface 130 could be coated with a first surface coating 134. Additionally or alternatively, the second surface 140 could be coated with a second surface coating 144. As an example, at least one of the first surface 130 or the second surface 140 could be coated by a single-layer anti-reflective coating or a multi-layer anti-reflective coating.

In example embodiments, the optical system 100 could include a lidar system 160. The lidar system 160 could be configured to provide range data within a lidar field of view 162. In such scenarios, the desired field of view 150 could overlap the lidar field of view 162. Additionally or optionally, the lidar system 160 could include a housing 164. In such scenarios, the light-emitter device 110 and the optical element 120 could be disposed inside the housing 164.

In some embodiments, the optical system 100 could be configured to operate within an operating temperature range between −40° C. and 85° C. However, other operating temperature ranges are possible and contemplated.

FIG. 2 illustrates a prior art optical system 200. As illustrated in FIG. 2, the prior art optical system 200 could include a laser source 210 and a Fresnel lens element 220. The prior art optical system 200 could also include an engineered diffuser 230. The laser source 210 could be configured to emit light 212 toward the Fresnel lens element 220 so as to collimate the emitted light and provide collimated light 222. The collimated light 222 could interact with the engineered diffuser 230 so as to provide an angularly-controlled top-hat intensity profile 240.

FIG. 3A illustrates the optical element 120 of the optical system 100 of FIG. 1, according to an example embodiment. As illustrated in FIG. 3A, the optical element 120 could include diffusing surface 132 and a focusing surface 142. In an example embodiment, the diffusing surface 132 could include a one- or two-dimensional microlens array. In an example embodiment, the microlens array could include a plurality of lenslets, each lenslet having a diameter of less than a millimeter in at least one dimension. The lenses making up the microlens array could include spherical and/or aspherical lenslets. Additionally or alternatively, the lenses of the microlens array could include non-rotationally symmetric optical elements such as biconics and/or toroids.

Additionally or alternatively, the focusing surface 142 could include a Fresnel lens surface. In some embodiments, the Fresnel lens surface could include a lens that may be substantially thinner than a conventional refractive lens element. That is, a cross-section of the spherical Fresnel lens surface could be substantially thinner than a cross-section of a conventional spherical plano-convex lens of equivalent optical power.

In some embodiments, the Fresnel lens surface could include an imaging (e.g., spherical or cylindrical) lens surface or a non-imaging (e.g., spot or linear) lens surface. In various examples, the Fresnel lens surface could include a plurality of grooved and/or stepped concentric curved surfaces.

In various examples, the optical element 120 could have a rectangular solid shape having a long axis (e.g., along the z-axis as illustrated in FIG. 3A) and a short axis (e.g., along the y-axis as illustrated in FIG. 3A). In such scenarios, the optical element 120 including the diffusing surface 132 (e.g., microlens array) and the focusing surface 142 (e.g., the Fresnel lens surface) could provide a "fast axis" angular divergence 300 of between 26 degrees and 30 degrees with respect to a normal axis 302.

In some embodiments, the diffusing surface 132 (e.g., microlens array) and the focusing surface 142 (e.g., the Fresnel lens surface) could be configured to provide a "slow axis" angular divergence 310 of between 6.5 degrees and 8.5 degrees with respect to the normal axis 302.

In example embodiments, the optical element 120 could include a clear aperture 324. Namely, the clear aperture 324 could include a slow axis clear aperture 322 of at least 10 millimeters and a fast axis clear aperture 320 of at least 40 millimeters. It will be understood that other dimensions of clear aperture 324 are possible and contemplated.

In some examples, at least one of the first surface 130 or the second surface 140 could be configured to provide a back focal length between 40 millimeters and 50 millimeters. However, other back focal lengths are possible. In some embodiments, the light-emitter device 110 could be disposed so as to emit light toward the optical element 120 from a position along the normal axis 302 at or near the back focal length. In positioning and/or arranging the light-emitter device 110 along the normal axis, a centered emission pattern may be provided. Additionally or alternatively, if the light-emitter device 110 is positioned or arranged in an off-axis orientation, the emission pattern may be angularly displaced with respect to the normal axis, but the emission pattern may still retain the angularly-controlled top-hat intensity profile. In such scenarios, the performance of the optical system may be relatively insensitive to the location of the light-emitter device 110.

Figure 3B:
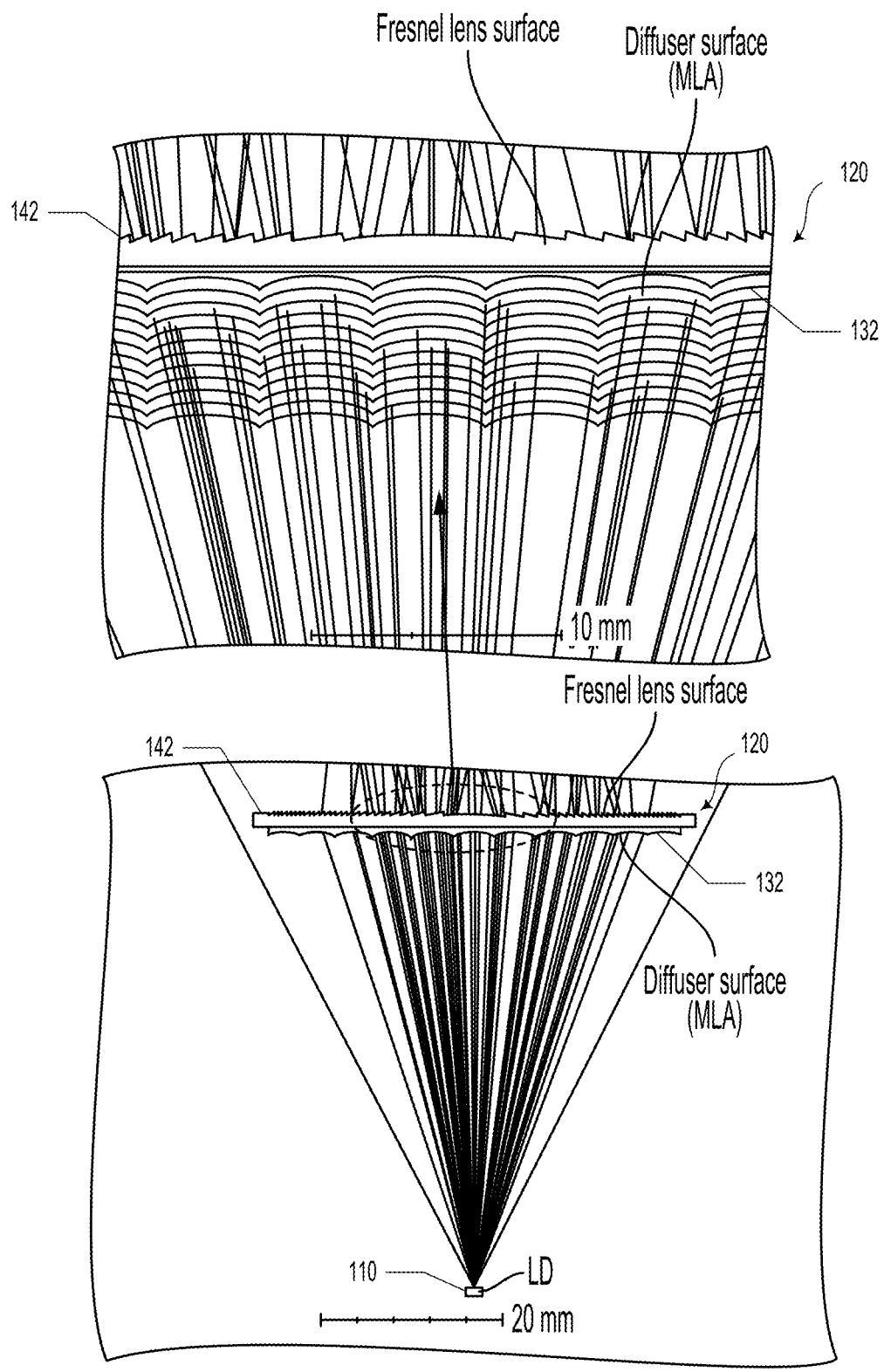
FIG. 3B illustrates the optical element of the optical system of FIG. 1, according to an example embodiment.

FIG. 3B illustrates the optical element 120 of the optical system 100 of FIG. 1, according to an example embodiment. FIG. 3B could illustrate a ray-tracing model of light interactions with the optical element 120. In some embodiments, the diffusing surface 132 (e.g., microlens array) and the focusing surface 142 (e.g., the Fresnel lens surface) could be configured to transmit light within a wavelength range between 900 nanometers and 930 nanometers. It will be understood that the optical element 120 could be configured to transmit light having other wavelengths.

Figure 3C:
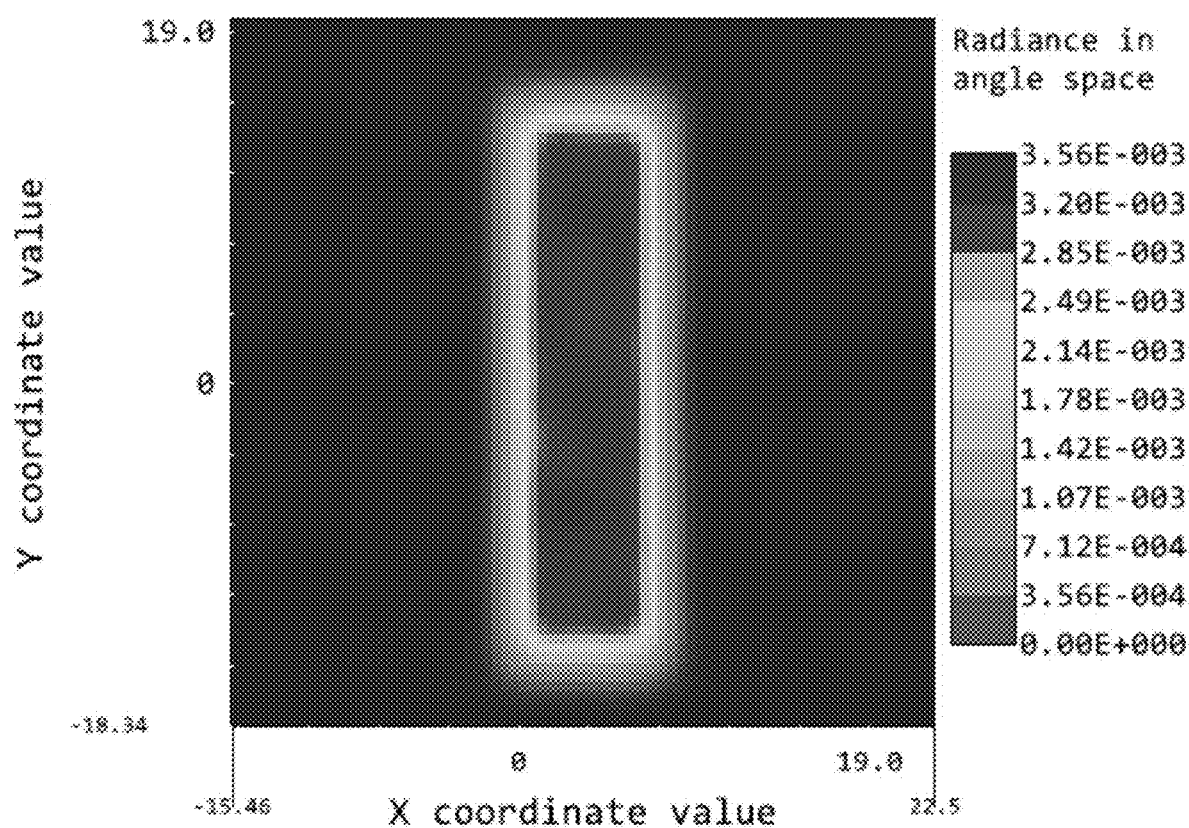
FIG. 3C illustrates a luminance angle distribution of the optical system of FIG. 1, according to an example embodiment.

FIG. 3C illustrates a luminance angle distribution 330 of the optical system 100 of FIG. 1, according to an example embodiment. In some embodiments, the desired intensity profile 152 could include a substantially uniform intensity distribution of light across the desired field of view 150. As illustrated in FIG. 3C, the luminance angle distribution 330 could include a uniform distribution of light within 1%, 5%, 10%, or 20% over the clear aperture 324 of the optical element 120. In some embodiments, the luminance angle distribution 330 could indicate uniform light distribution over a far field region (e.g., 1 meter away, 10 meters away, or 30 meters away) with respect to the optical system 100.

Figure 4:
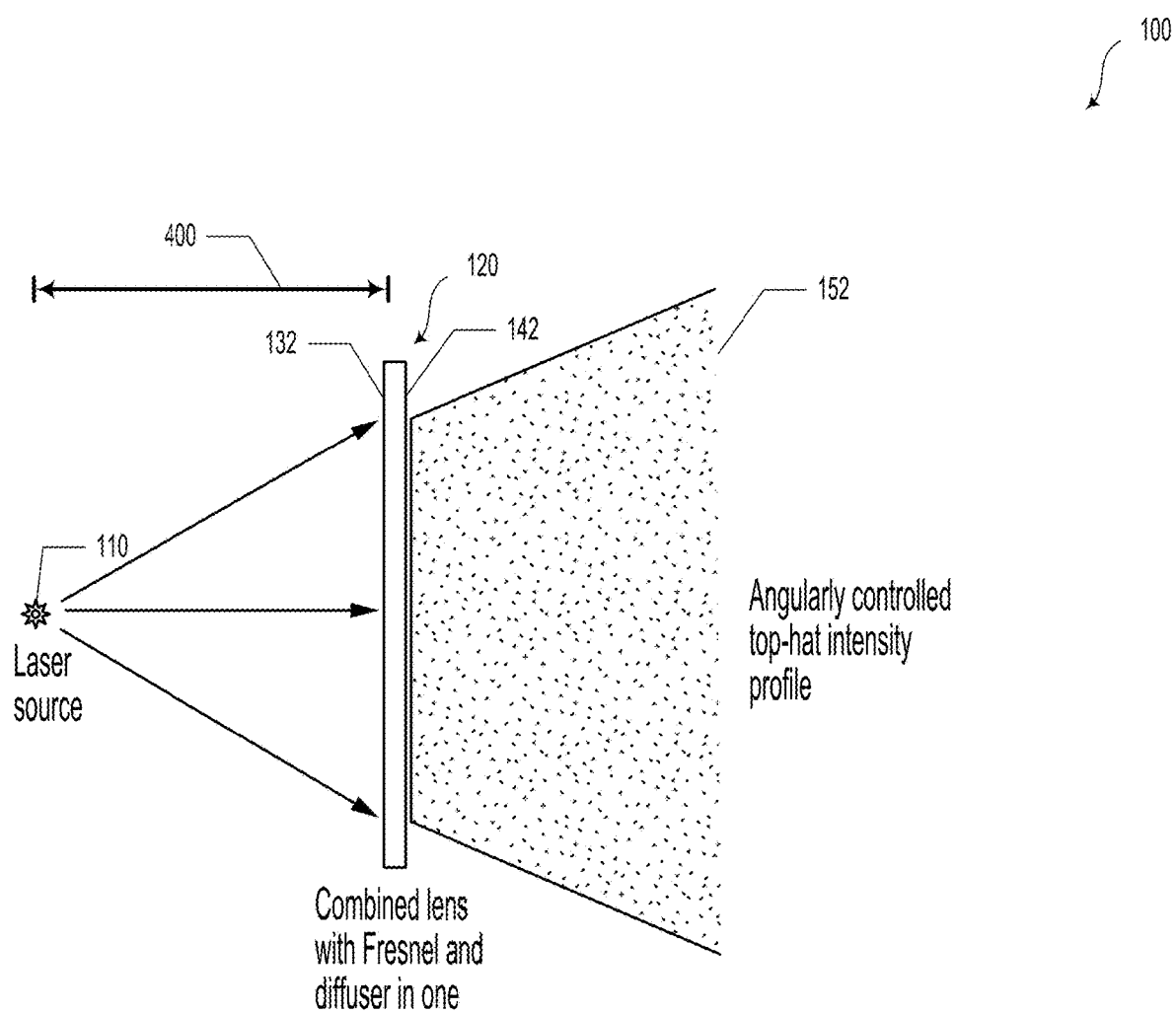
FIG. 4 illustrates the optical system of FIG. 1, according to an example embodiment.
Figure 5A:
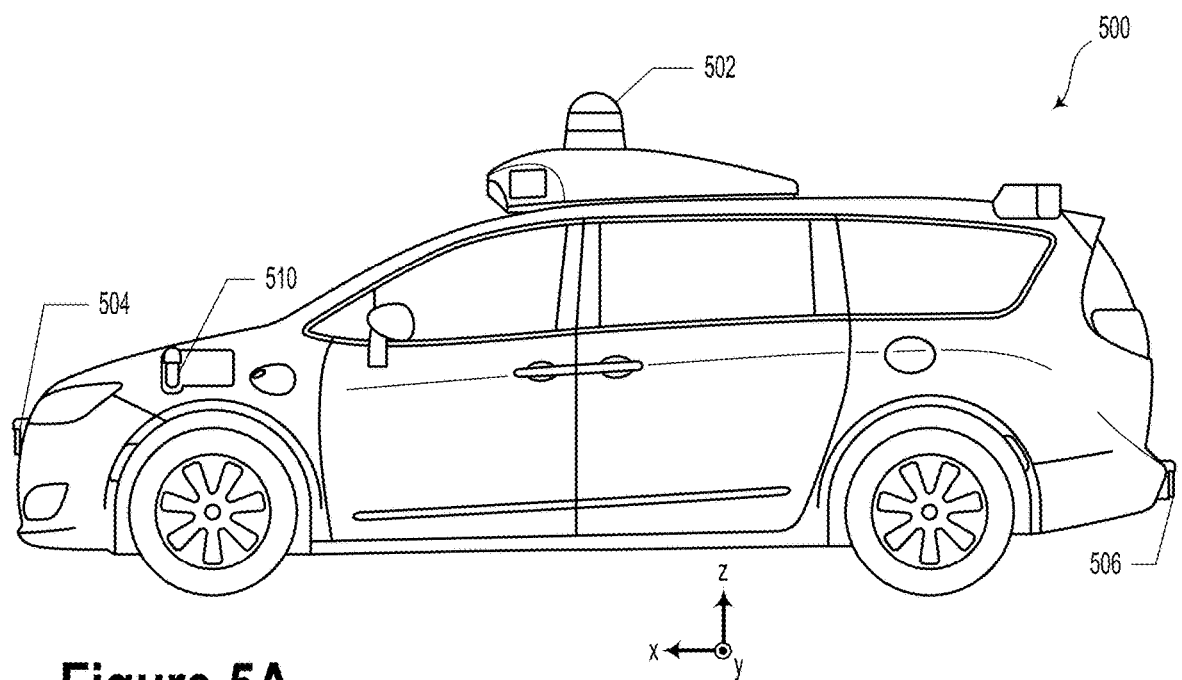
FIG. 5A illustrates a vehicle, according to an example embodiment.
Figure 5B:
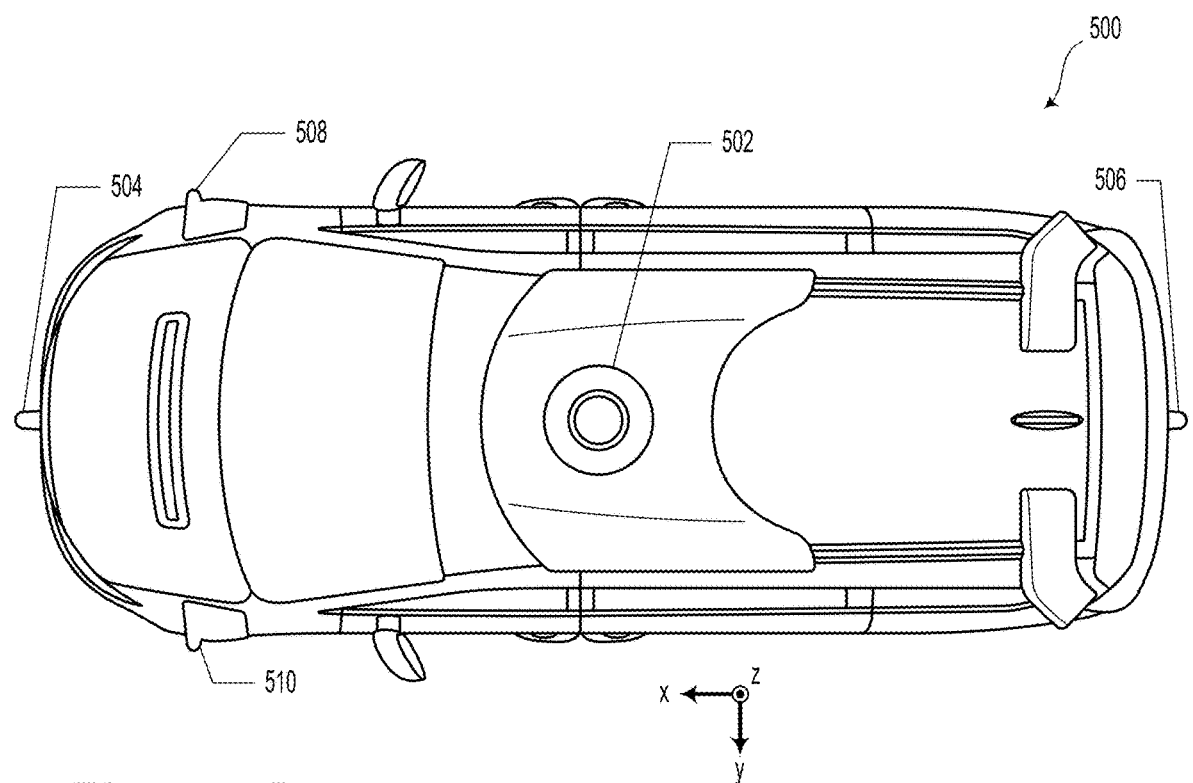
FIG. 5B illustrates a vehicle, according to an example embodiment.
Figure 5C:
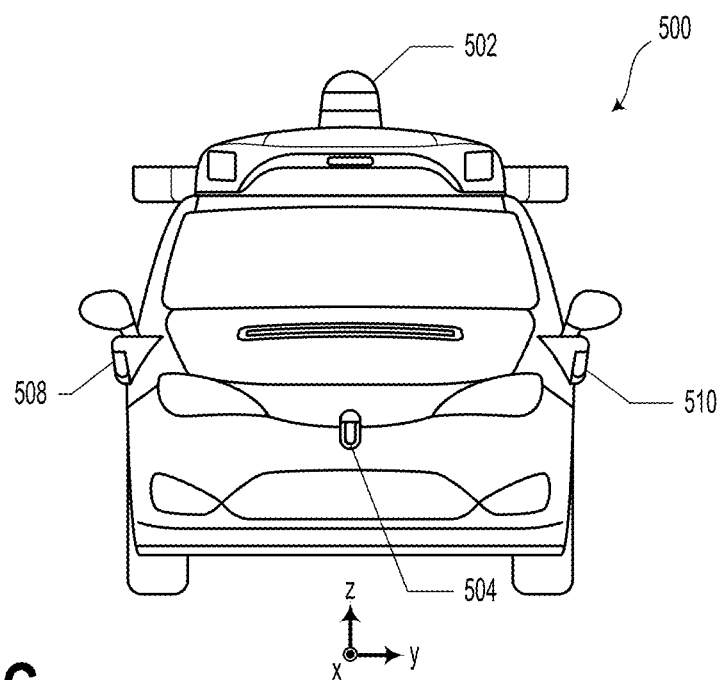
FIG. 5C illustrates a vehicle, according to an example embodiment.
Figure 5D:
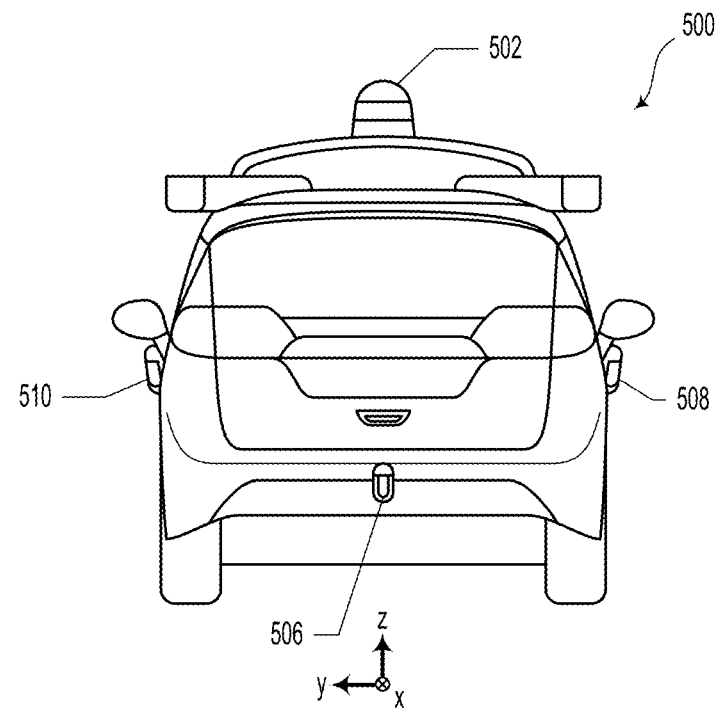
FIG. 5D illustrates a vehicle, according to an example embodiment.
Figure 5E:
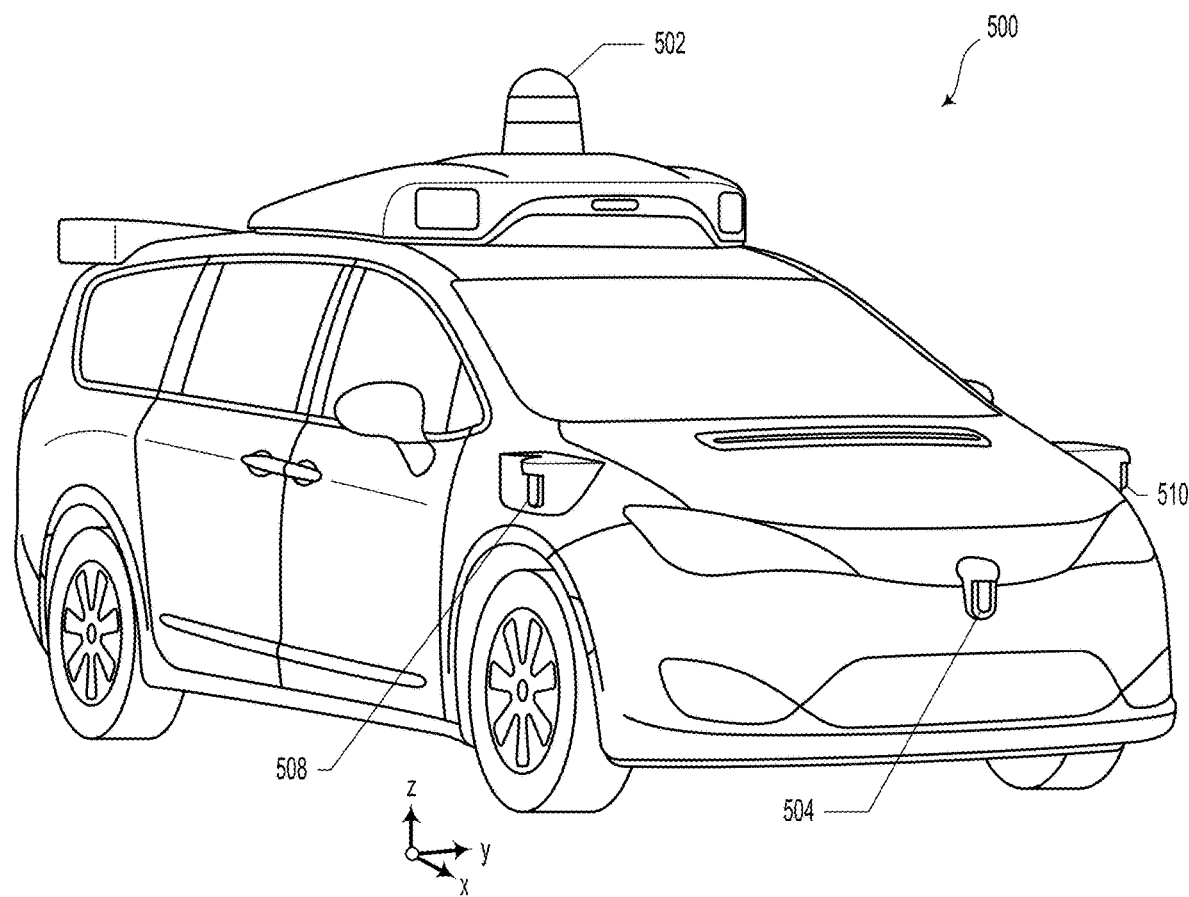
FIG. 5E illustrates a vehicle, according to an example embodiment.

FIG. 4 illustrates the optical system 100 of FIG. 1, according to an example embodiment. As illustrated in FIG. 4, optical system 100 could include a light-emitter device 110, such as a laser source. In some embodiments, the light-emitter device 110 could be disposed at a back focal distance 400 with respect to the optical element 120.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include optical system(s) 100 as illustrated and described in relation to FIG. 1. In other words, the optical systems and lidar systems described elsewhere herein could be coupled to the vehicle 500 and/or could be utilized in conjunction with various operations of the vehicle 500. As an example, the optical system 100 and/or lidar systems described herein could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, sensor systems 502, 504, 506, 508, and 510 could include a plurality of light-emitter devices arranged over a range of angles with respect to a given plane (e.g., the x-y plane) and/or arranged so as to emit light toward different directions within an environment of the vehicle 500. For example, one or more of the sensor systems 502, 504, 506, 508, and 510 may be configured to scan, e.g., beam steer or rotate about one or more axis (e.g., the z-axis) perpendicular to the given plane, so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

Lidar systems with single or multiple light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors, such as cameras, radars, etc.

In various embodiments, vehicle 500 could include an optical system (e.g., optical system 100 as illustrated and described in reference to FIG. 1). In such scenarios, the optical system could include a lidar system (e.g., lidar system 160) that may be configured to provide range data within a lidar field of view (e.g., lidar field of view 162). The optical system includes a light-emitter device (e.g., light-emitter device 110) configured to emit emission light. In some embodiments, the light-emitter device could include a multi-bar laser diode device, as described elsewhere herein.

The optical system also includes an optical element (e.g., optical element 120). The optical element includes a first surface (e.g., first surface 130) and an opposing second surface (e.g., second surface 140). The first surface includes a diffusing surface (e.g., diffusing surface 132) configured to diffuse the emission light to form diffused light. The second surface includes a focusing surface (e.g., focusing surface 142) configured to focus the diffused light to provide a desired intensity profile (e.g., desired intensity profile 152) of light emitted within a desired field of view (e.g., desired field of view 150) of the optical system.

In some embodiments, the desired intensity profile includes a uniform angle distribution of light across the lidar field of view.

Additionally or alternatively, in some embodiments the optical element desired field of view overlaps the lidar field of view. As an example, a combination of the light-emitter device and the optical element could provide an illumination region that corresponds to the desired field of view.

In various embodiments, the lidar system could include a housing (e.g., housing 164). In such scenarios, the light-emitter device and the optical element could be disposed inside the housing.

In example embodiments, the optical system could be configured to operate within an operating temperature range between −40° C. and 85° ° C. Other operating temperature ranges are possible and contemplated.

IV. Further Example Embodiments

Figure 6:
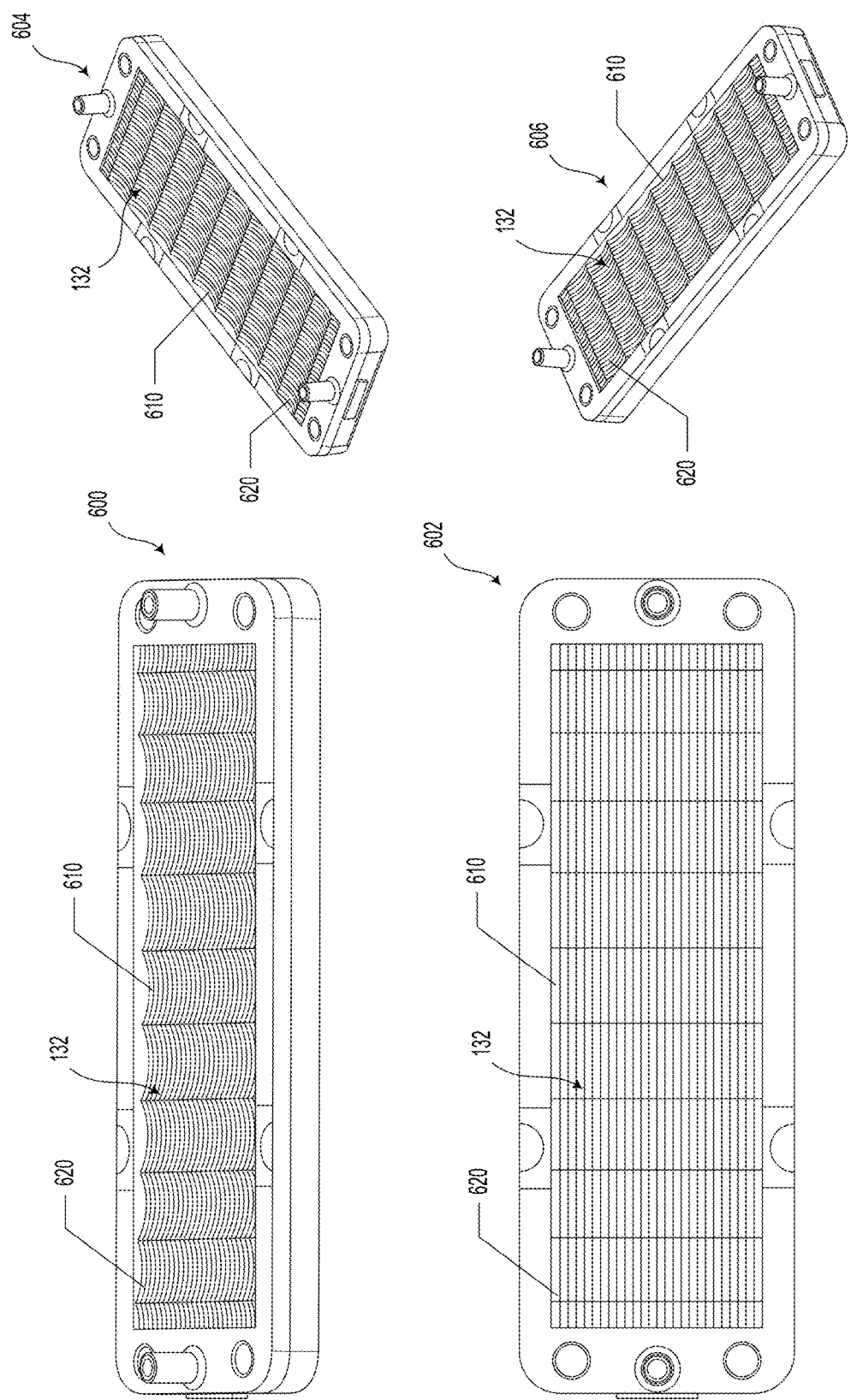
FIG. 6 illustrates the optical system of FIG. 1, according to an example embodiment.

FIG. 6 illustrates various views 600, 602, 604, and 606 of the optical system 100 of FIG. 1, according to an example embodiment. As illustrated in FIG. 6, the optical system 100 includes a diffusing surface 132 configured to diffuse the emission light to form diffused light. As described herein, the diffusing surface 132 includes a plurality of lens element arranged in a matrix along a plane. In such a scenario, the plurality of lens elements constitute a microlens array. Furthermore, the microlens array could include a concave lens having a rectangular planar view shape. In some embodiments, the diffusing surface 132 could substantially form a concave shape.

In various embodiments, the diffusing surface 132 could include one or more central lens elements 610 that could be disposed in a central region of the diffusing surface 132. Additionally or alternatively, the diffusing surface 132 could include one or more peripheral lens elements 620 that could be disposed at one or more peripheral regions of the diffusing surface 132.

Figure 7:
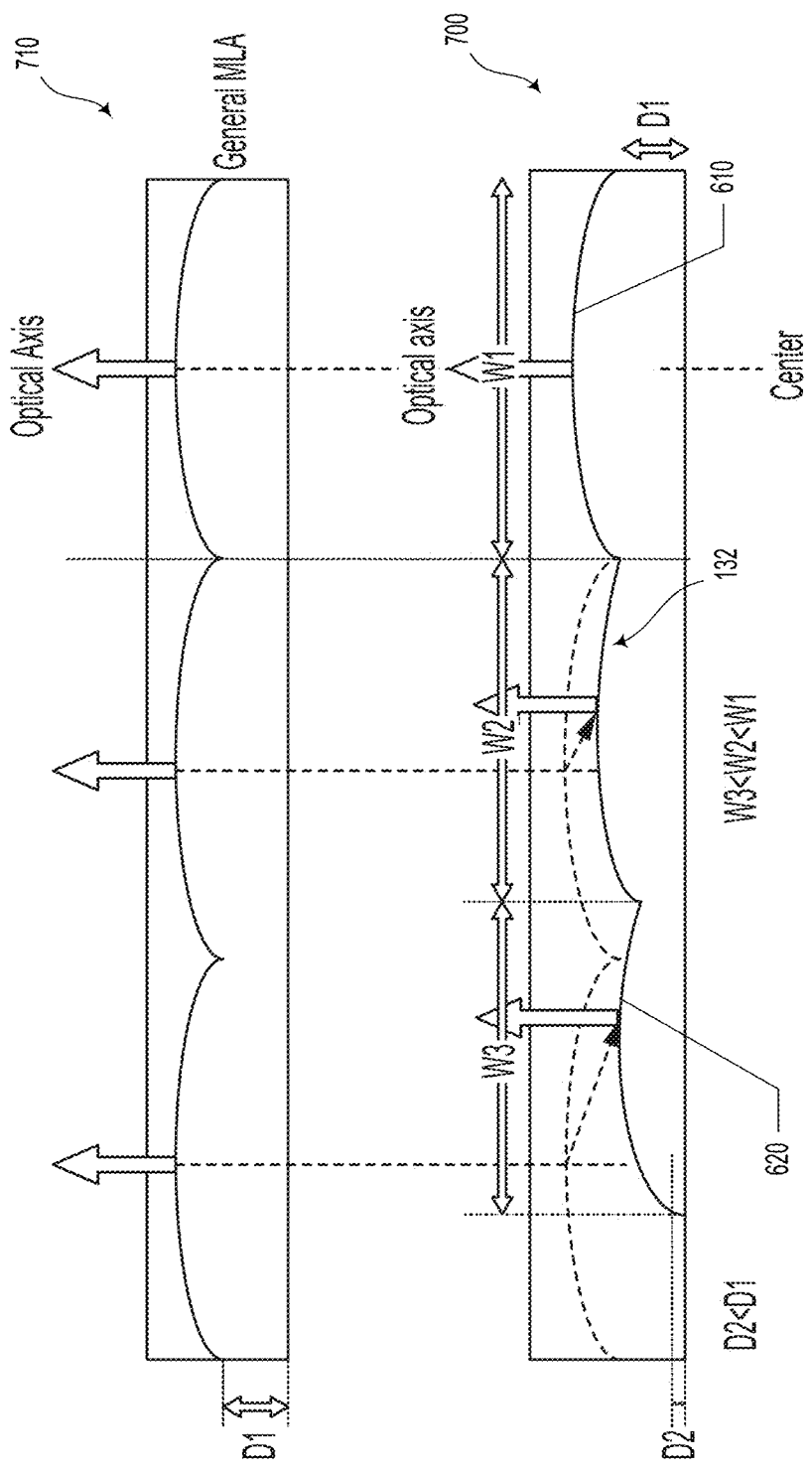
FIG. 7 illustrates the optical system of FIG. 1, according to an example embodiment.

FIG. 7 illustrates portions of the optical system 100 of FIG. 1, according to an example embodiment. As illustrated, FIG. 7 includes cross-sectional views of a microlens array 710 and a staggered microlens array 700. In such a scenario, the staggered microlens array 700 could include a central lens element 610 of the microlens array may include a step width (e.g., W1) that is wider than a corresponding step width (e.g., W2 and W3) of peripheral lens elements 620. Additionally or alternatively, the central lens element 610 could have a deeper depth (e.g., D1) as compared to a shallower depth (e.g., D2) relating to peripheral lens elements 620.

Figure 8:
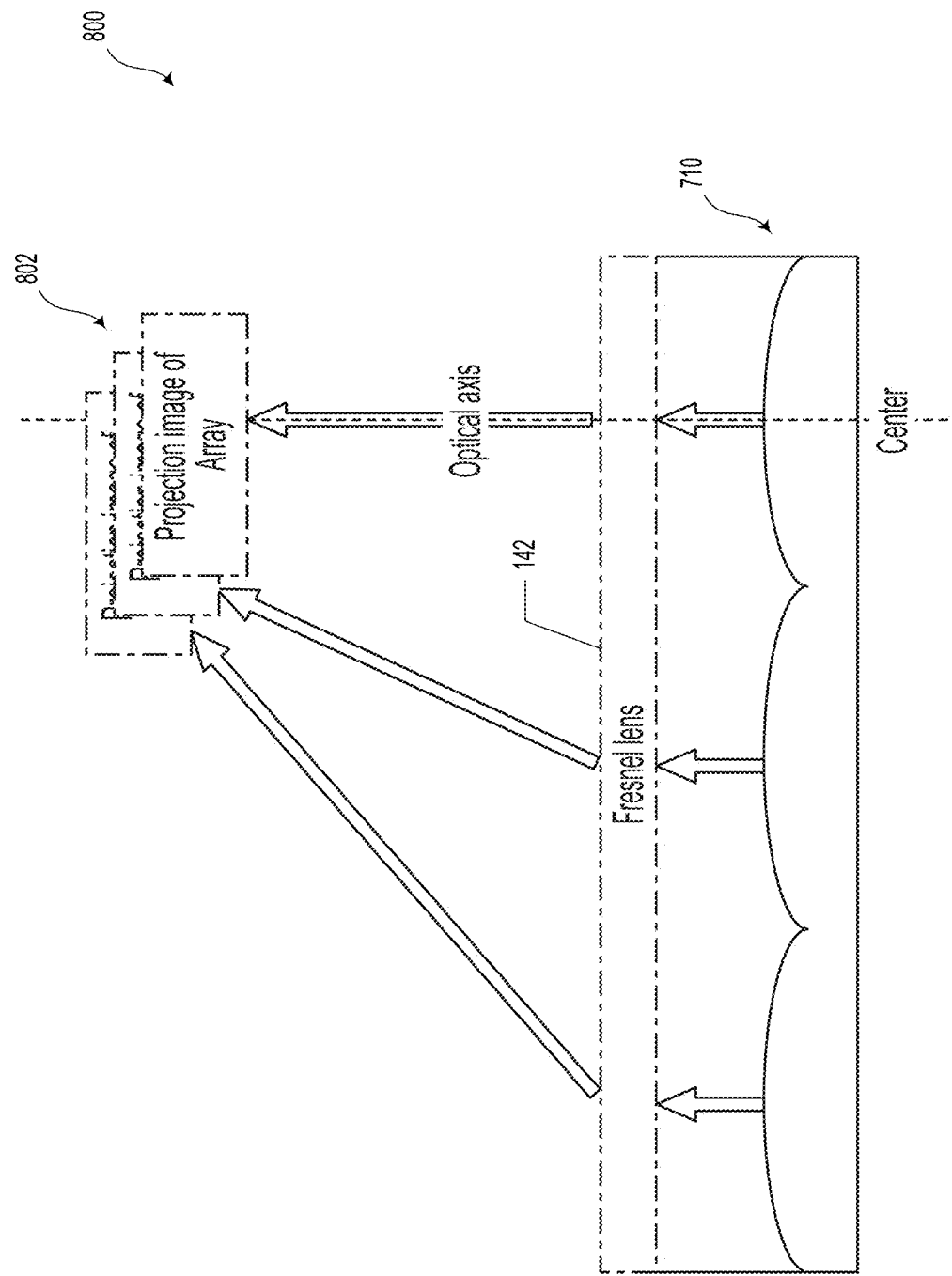
FIG. 8 illustrates the optical system of FIG. 1, according to an example embodiment.

FIG. 8 illustrates the optical system 100 of FIG. 1, according to an example embodiment. As illustrated in FIG. 8, light passing through a microlens array 710 and Fresnel lens 142 could provide a plurality of misaligned image projections 802.

Figure 9:
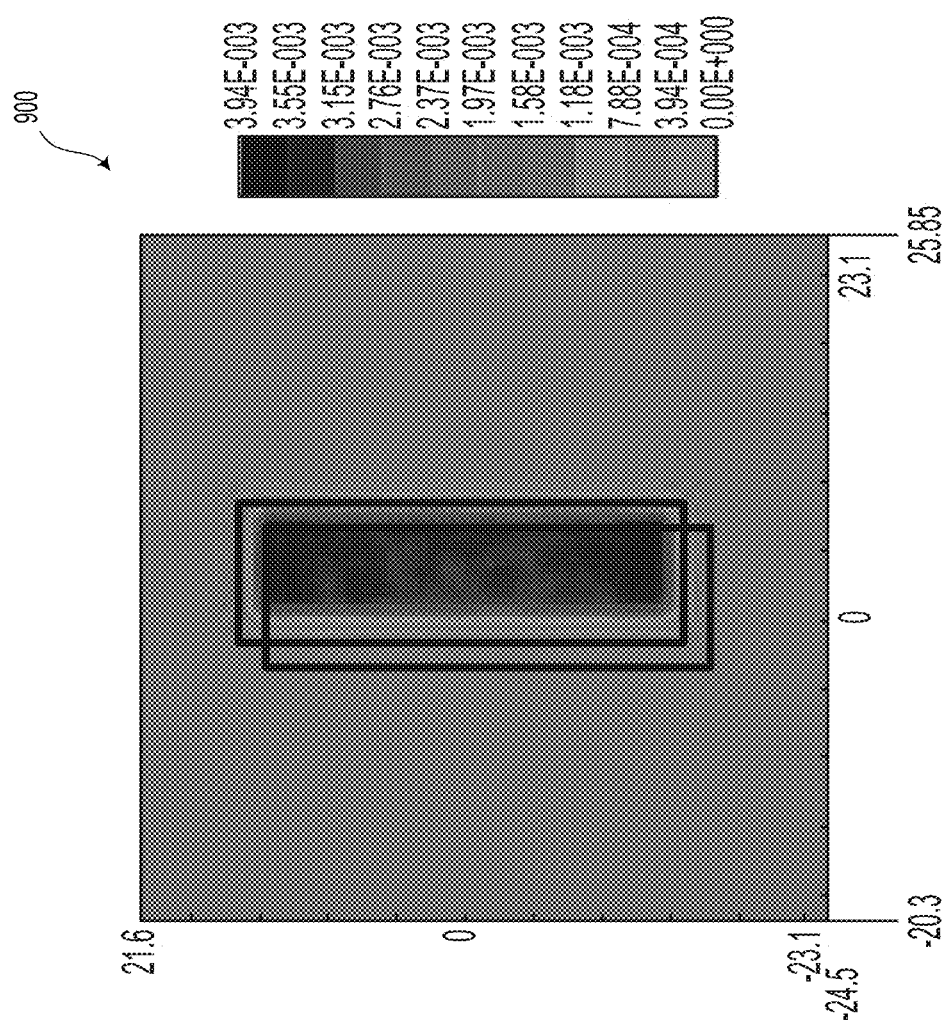
FIG. 9 illustrates an optical intensity pattern, according to an example embodiment.

FIG. 9 illustrates an optical intensity pattern 900, according to an example embodiment. In such a scenario, the optical intensity pattern 900 could correspond to misaligned image projections 802 provided by light passing through microlens array 710 and Fresnel lens 142.

Figure 10:
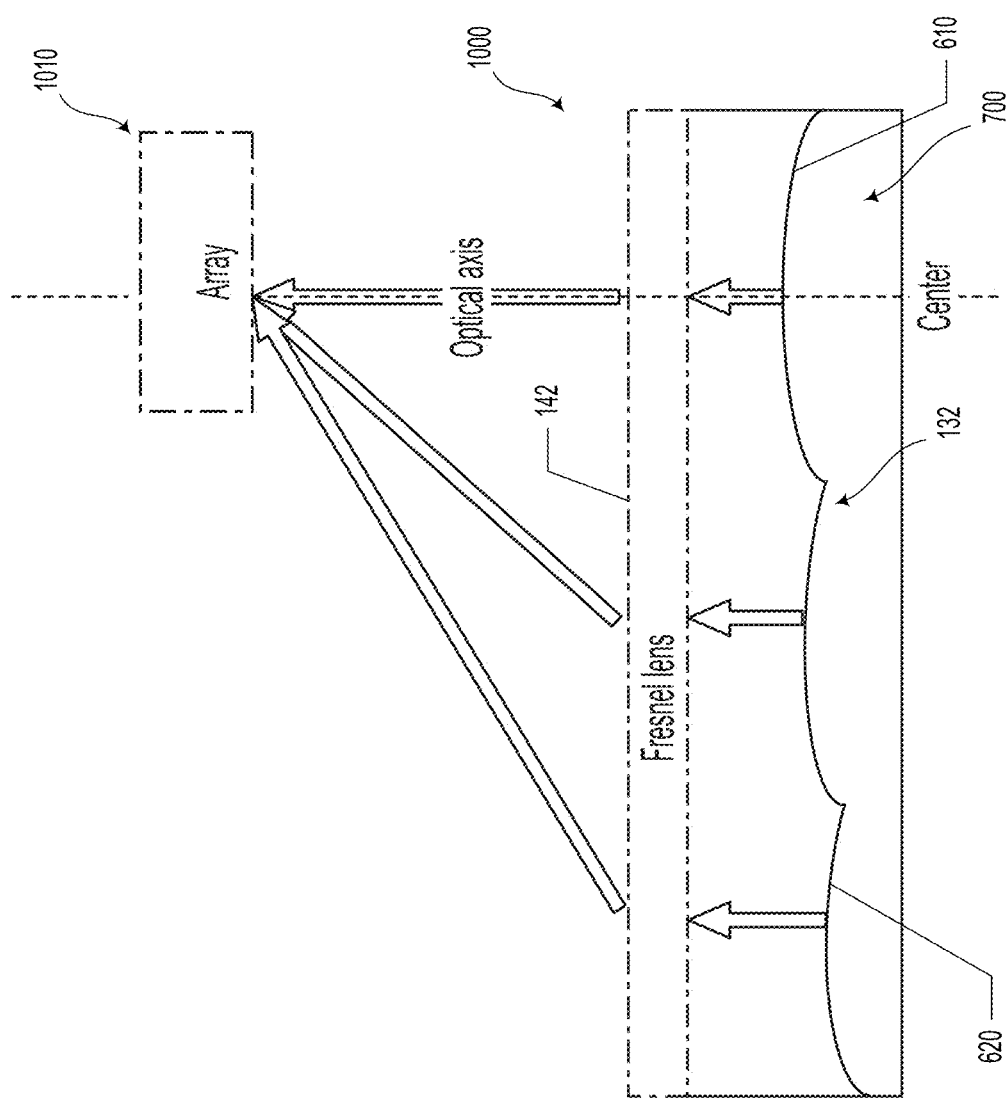
FIG. 10 illustrates the optical system of FIG. 1, according to an example embodiment.

FIG. 10 illustrates the optical system 100 of FIG. 1, according to an example embodiment. In contrast to FIG. 8, FIG. 10 illustrates a staggered microlens array 700 with a diffusing surface 132 having one or more central lens elements 610 and one or more peripheral lens elements 620. In such a scenario, the combination of diffusing surface 132, with staggered microlens array 700, and Fresnel lens 142, may provide an aligned image projection 1010. In other words, light passing through the staggered microlens array 700 and the Fresnel lens 142 could provide a well-aligned combination of images at a same location and/or region.

Figure 11:
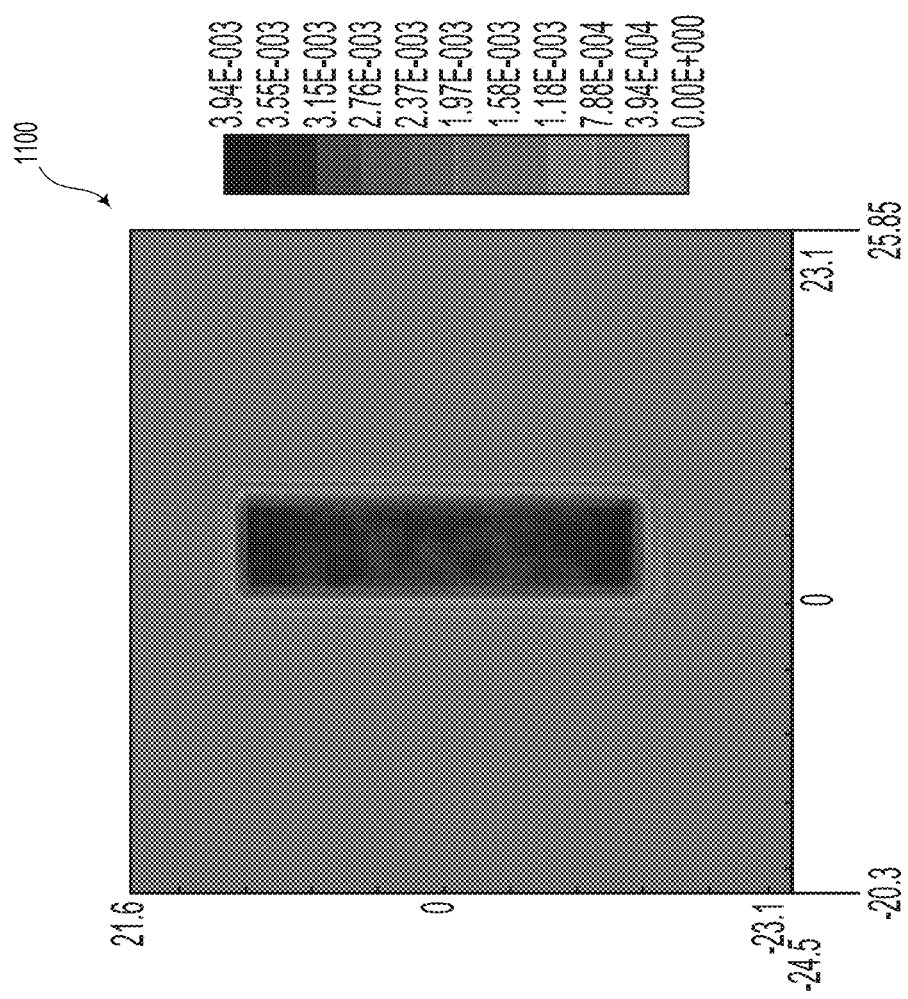
FIG. 11 illustrates an optical intensity pattern, according to an example embodiment.

FIG. 11 illustrates an optical intensity pattern 1100, according to an example embodiment. In such a scenario, the optical intensity pattern 1100 could correspond to a well-aligned image projection 1010. It will be understood that the optical intensity pattern 1100 could represent a desired intensity profile 152, such as a uniform rectangular intensity profile, of light emitted within a field of view 150 of the optical system 100.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   a light-emitter device configured to emit emission light; and
   an optical element comprising a first surface and an opposing second surface, wherein the first surface comprises a diffusing surface configured to diffuse the emission light to form diffused light, wherein the diffusing surface comprises a plurality of lens elements that constitute a microlens array, wherein the microlens array comprises a central lens element and peripheral lens elements, wherein the central lens element comprises a step width that is wider than a corresponding step width of the peripheral lens elements, wherein the second surface comprises a focusing surface configured to focus the diffused light to provide an intensity profile of light emitted within a field of view of the optical system, and wherein the focusing surface comprises a Fresnel lens surface.

2. The optical system of claim 1, wherein the microlens array comprises a concave lens having a rectangular planar view shape.

3. The optical system of claim 1, wherein the diffusing surface comprises a concave shape.

4. The optical system of claim 1, wherein the diffusing surface is configured to provide a uniform rectangular intensity profile of light emitted within a field of view of the optical system.

5. The optical system of claim 1, wherein the microlens array and the Fresnel lens surface provide a fast axis divergence of between 26 degrees and 30 degrees with respect to a normal axis.

6. The optical system of claim 1, wherein the microlens array and the Fresnel lens surface provide a slow axis divergence of between 6.5 degrees and 8.5 degrees with respect to a normal axis.

7. The optical system of claim 1, wherein the optical element comprises a clear aperture of at least 10 millimeters along a slow axis and at least 40 millimeters along a fast axis.

8. The optical system of claim 1, wherein at least one of the first surface or the second surface are configured to provide a back focal length between 40 millimeters and 50 millimeters.

9. The optical system of claim 1, wherein the optical element is formed from at least one of: compression molded glass, a cyclic olefin copolymer (COC or COP) material, polymethylmethacrylate, polycarbonate, polypropylene, or polyethylene.

10. The optical system of claim 1, wherein at least one of the first surface or the second surface is coated by an anti-reflective coating.

11. The optical system of claim 1, wherein the optical element is configured to transmit light within a wavelength range between 900 nanometers and 930 nanometers.

12. The optical system of claim 1, wherein the optical system is configured to operate within an operating temperature range between −40° C. and 85° C.

13. The optical system of claim 1, wherein the light-emitter device comprises at least one laser diode device.

14. The optical system of claim 1, further comprising a lidar system configured to provide range data within a lidar field of view, wherein the field of view of the optical system overlaps the lidar field of view.

15. The optical system of claim 14, wherein the lidar system comprises a housing, wherein the light-emitter device and the optical element are disposed inside the housing.

16. A vehicle comprising:
  an optical system, wherein the optical system comprises:
    a lidar system configured to provide range data within a lidar field of view;
    a light-emitter device configured to emit emission light; and
    an optical element comprising a first surface and an opposing second surface, wherein the first surface comprises a diffusing surface configured to diffuse the emission light to form diffused light, wherein the diffusing surface comprises a plurality of lens elements that constitutes a microlens array, wherein the microlens array comprises a central lens element and peripheral lens elements, wherein the central lens element comprises a step width that is wider than a corresponding step width of the peripheral lens elements, wherein the second surface comprises a focusing surface configured to focus the diffused light to provide an intensity profile of light emitted within a field of view of the optical system, wherein the focusing surface comprises a Fresnel lens surface.

17. The vehicle of claim 16, wherein the intensity profile comprises a uniform intensity distribution of light emitted within the field of view of the optical system.

18. The vehicle of claim 16, wherein the field of view of the optical system overlaps the lidar field of view.

19. The vehicle of claim 16, wherein the optical system is configured to operate within an operating temperature range between −40° C. and 85° C.

20. The vehicle of claim 16, wherein the microlens array comprises a concave lens having a rectangular planar view shape.

* * * * *